Figure 1:
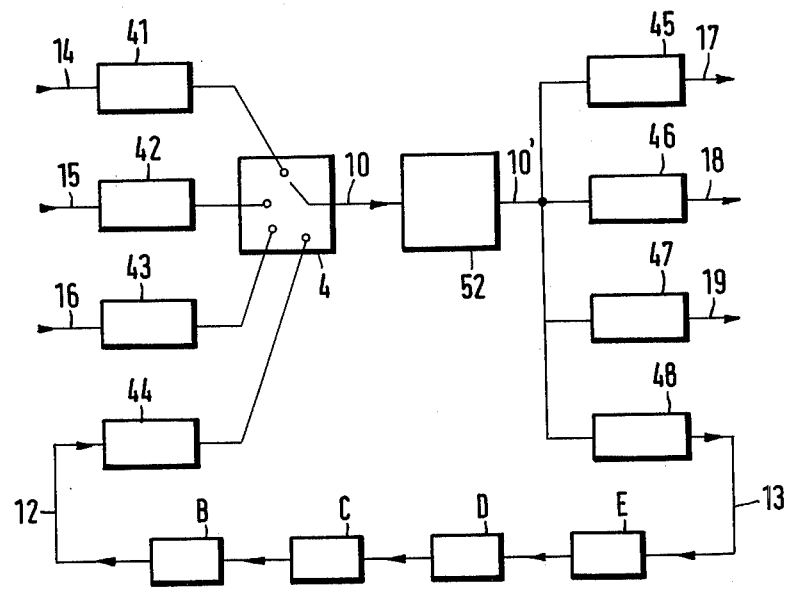

United States Patent [19]

Schwerdtel

[11] 4,079,209

[45] Mar. 14, 1978

[54] METHOD AND APPARATUS FOR LIMITING THE NUMBER OF BUILD-UP PACKETS DURING THE PROCESS OF BUILDING UP A ROUTING ADDRESS IN A DIGITAL TELECOMMUNICATION NETWORK

[75] Inventor: Eberhard Schwerdtel, Thorishaus, Switzerland

[73] Assignee: Hasler AG, Bern, Switzerland

[21] Appl. No.: 719,233

[22] Filed: Aug. 31, 1976

[30] Foreign Application Priority Data

Nov. 3, 1975 Switzerland .................. 14145/75

[51] Int. Cl.² .............................................. H04Q 3/68
[52] U.S. Cl. .............................. 179/18 EA; 178/2 C; 179/15 BA
[58] Field of Search ............. 178/2 R, 2 C, 2 B, 2 D, 178/2 E, 3; 340/147 R, 147 T; 179/18 EA, 15 BA

*Primary Examiner*—Thomas A. Robinson
*Attorney, Agent, or Firm*—Brady, O'Boyle & Gates

[57] ABSTRACT

The invention relates to a method for limiting the number of build-up packets during the process of building-up a routing address for the subsequent transmission of address-coded packets, the addresses of these packets being this said routing address, from a first to a second subscriber of a digital telecommunication network. This network comprises a plurality of switching nodes, a plurality of subscribers, a plurality of bearer channels connecting each switching node with at least one other switching node and with no subscriber, or with one or more of said subscribers, a plurality of routing words individually assigned to the bearer channels and a plurality of call numbers individually assigned to the subscribers. During the process of building-up a routing address the first subscriber despatches a build-up packet containing the call number of the called second subscriber, said build-up packet received by a first switching node is retransmitted through all bearer channels connected to this switching node, such retransmission being continued at each switching node upon reception of each build-up packet, thus the number of build-up packets increasing rapidly within the network. The method for limiting this number of build-up packets comprises at each switching node the storing of the call number of the second subscriber upon reception of a first build-up packet during a predetermined time interval starting with the reception of this first build-up packet, comparing during said time interval the call numbers contained in the subsequently received build-up packets with the call number stored, counting all of said subsequently received build-up packets with a call number corresponding with the call number stored, comparing respective count with a predetermined limiting value, and eliminating each of said subsequently received build-up packet, if said respective count is higher than said predetermined limiting value.

2 Claims, 2 Drawing Figures

METHOD AND APPARATUS FOR LIMITING THE NUMBER OF BUILD-UP PACKETS DURING THE PROCESS OF BUILDING UP A ROUTING ADDRESS IN A DIGITAL TELECOMMUNICATION NETWORK

CROSS REFERENCE TO RELATED APPLICATION

In copending U.S. Pat. application Ser. No. 679,074, by Emanuel Hafner, et al., filed Apr. 21, 1976 (corresponding to Swiss application No. 5346/75) and owned by the Assignee of the present application, a digital telecommunication network of this type is described. In copending U.S. Pat. Application Ser. No. 705,251, by Emanuel R. Hafner, filed July 14, 1976 (corresponding to Swiss Applications 9990/75 and 10711/75), and owned by the Assignee of the present application, a method of this type is described.

DESCRIPTION OF THE PRIOR ART

With respect to prior art, e.g. copending U.S. Pat. application Ser. No. 679,074, E. Hafner et al, filed Apr. 21, 1976, describes a digital telecommunication network comprising a plurality of switching nodes, a plurality of subscribers, a plurality of bearer channels connecting each switching node with at least one other switching node and with no subscriber, or with one or more of said subscribers, a plurality of routing words individually assigned to the bearer channels and a plurality of call numbers individually assigned to the subscribers. Each, two of the subscribers can correspond with one and the other by sending address-coded packets, the addresses being routing addresses. These routing addresses are formed as the stringing-together of routing words.

Copending U.S. Pat. Application Ser. No. 705,251, by Emanuel Hafner, describes the method of how the routing addresses are built-up. During such a process of building-up a routing address a first subscriber dispatches a build-up packet containing the call number of the called second subscriber, said build-up packet received by a first switching node is re-transmitted through all bearer channels connected to this switching node. In retransmitting the build-up packet through a bearer channel the routing word assigned to this bearer channel is picked up by the build-up packet. Such retransmission and picking-up of routing words is continued at each switching node upon receiption of each build-up packet. Thus the number of build-up packets increases rapidly within the whole network and the length of the build-up packet grows too. Packets that are too long are eradicated. The process of building-up a routing address therefore continues until all build-up packets are eradicated on account of having too great a length.

In the case of extensive networks therefore a considerable proportion of the transmission capacity available on the trunk circuits and within the switching nodes can be claimed by build-up packets.

SUMMARY OF THE INVENTION

The task of the present invention therefore consists in providing a method and the pertinent apparatus in the said telecommunications network wherein, upon the build-up of routing addresses the number of build-up packets can be reduced and limited. This happens by each switching node, during a time interval which begins with the arrival of a first build-up packet, counting the number of the incoming build-up packets, and from each switching node, at the most the $m$ first packets are despatched once more.

Figure 2:
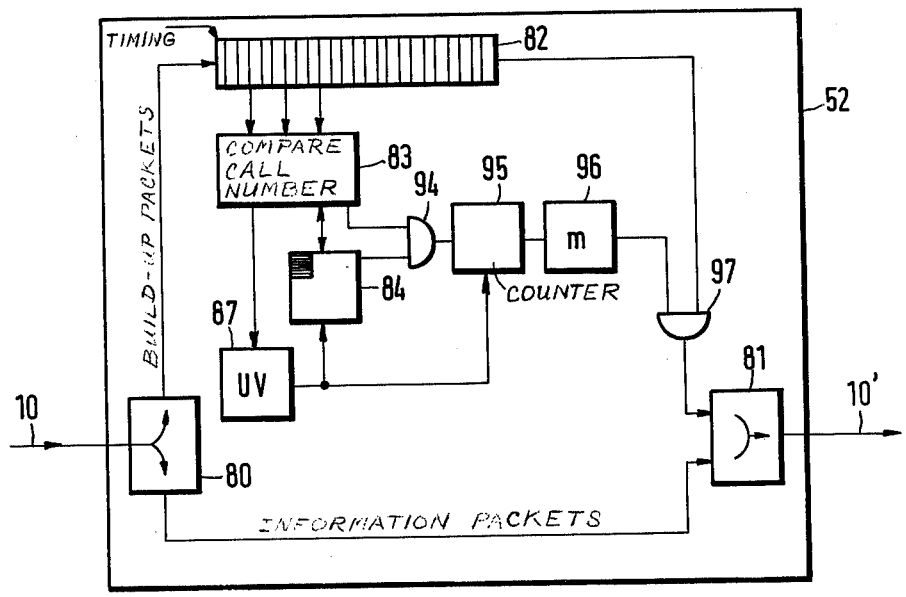

The invention is explained in more detail by way of example with reference to FIGS. 1 and 2, in which:

FIG. 1 shows the simpified circuit diagram of a switching node of the network; and FIG. 2 shows the schematic diagram of a monitoring unit.

In FIG. 1 all of the packets arriving via the incoming circuits 14, 15 and 16 reach, via the pertinent input circuits 41, 42 or 43, the multiplexer 4. Accordingly this latter is reached by the packets which arrive from the local subscribers B, C and so forth via the input circuit 44. Via the bus lines 10, 10' the packets reach the output circuits 45 to 48 and therewith the outgoing circuits 17, 18 and 19, or the circuit 13 to the local subscribers B, C, D and E. The monitoring unit 52 which is inserted between the bus lines 10 and 10' forms the crux of the present invention. It is shown in detail in FIG. 2 and consists of a sorting switch 80 for separating the information packets and the build-up packets, a multiplexer 81 for forwarding the information and build-up packets to the bus line 10', a shift register 82, a comparator circuit 83 for identifying the call number in the build-up packets, a store 84 for storing the call number, a time limitation circuit 87 for adjusting the store time, a gate circuit 94, a counter 95 for counting the incoming build-up packets with the same call number, a threshold circuit 96 for comparing the counter state of counter 95 with a reference number $n$ and a gate 97.

The functional cycle in the monitoring unit 52 is as follows: via the bus line 10 all packets reach the monitoring unit 52. The sorting switch 80 separates the information packets and the build-up packets. The information packets are not further checked and pass via the multiplexer 81 onto the bus line 10'. The build-up packets are shifted into the shift register 82, where the comparator circuit 83 checks them to see what call number is contained in them and compares the call-number with the information stored in the store 84.

When the build-up packet is a first arriving build-up packet, no information, call-number, respectively, is stored into the store 84. At the same time the time limitation circuit 87 is switched in and a counting pulse emitted via the gate circuit 94 to the counter 95.

Each subsequently arriving build-up packet with the same call number also produces respectively a counting pulse which steps the counter 95 on by one step. In the case of build-up packets having different call numbers, on the other hand, the gate circuit 94 blocks the counting pulses. In this way the counter 95 counts the number of arriving build-up packets with a uniform call number. The first counted build-up packets leave the shift register 82 via the opened gate 97. With the aid of multiplexer 81 they are multiplexed into the general packet flow on the bus line 10'. However, as soon as the counter 95 reaches the number $m$, the threshold circuit 96 is triggered and the gate 97 blocked. In this way the retransmission of all subsequent build-up packets is prevented.

The time necessary for a routing address build-up, which is disclosed in the copending U.S. Pat. application Ser. No. 705,251, i.e. the time interval between the transmission of a build-up packet at a first subscriber's station and the arrival of at least one corresponding build-up packet at a called second subscriber's station is generally shorter than one second. The time interval of the time limitation circuit 87 is adjusted to a corresponding short time interval The time limitation circuit 87 resets the store 84 and the counter 95 to zero and therewith makes them start-clear for a new cycle at the end of the adjusted time interval.

The method restricts the number of retransmitted build-up packets with the same call number to a maximum of $m$ packets. This number $m$ can be adjusted and is advantageously selected between 1 and 10. Since those build-up packets which run via favourable paths in the network generally arrive earlier than those packets which use unfavourable paths, in this manner a restriction to those build-up packets, essential for the address build-up, is successful from which then the receiving subscriber can select the most favourable routing address by a method not described.

Since this most favourable address is not absolutely built up from the first arriving packet, the fundamental restriction to $m = 1$ would mean a restriction of this selection procedure.

If in the short adjusted time interval beginning with the arrival of a first build-up packet, the storing of the call-number thereof in the store 84, respectively, and ending with the resetting of the store 84 and counter 95, a build-up packet reaches the shift register 82, whose call-number is different from the call-number stored in the store 84, this packet is not counted by the counter 95 as described above and either is retransmitted via the gate 97 and the multiplexer 81 or is blocked by the gate 97 depending on the position of the counter 95 as previously described, and if blocked is thus eradicated.

If such overlaps of build-up packets reaching the shift register 82 frequently occur, then the monitoring unit 52 can be doubled in its main function, in that the units 82, 83, 84, 87, 94, 95, 96 and 97 are doubled and are interconnected similarly to what was described previously. Via an additional gate not shown then all of the build-up packets whose call numbers are not stored in the store 84 can be fed to the shift register 82' of the additional monitoring unit 52' and be processed there in a similar manner to what has been described.

If, on the other hand, on account of the briefness of the address build-up time, one precludes timewise overlapping build-up procedures as improbable, then the comparator circuit 83, the store 84 and the gate circuit 94 can be abolished, without the method being varied.

I claim:

1. A method for limiting the number of build-up packets during the process of building-up a routing address for the subsequent transmission of address-coded packets, the addresses of these packets being this said routing address, from a first to a second subscriber of a digital telecommunication network, this network comprising,
   a plurality of switching nodes,
   a plurality of subscribers including said first and second subscriber,
   a plurality of bearer channels connecting each switching node with at least one other switching node and with no, one or more of said subscribers,
   a plurality of routing words individually assigned to said bearer channels,
   a plurality of call numbers individually assigned to said subscribers,
   in which said process of building-up a routing address,
   the first subscriber dispatches a build-up packet containing the call number of the called second subscriber,
   said build-up packet received by the switching node connected to the first subscriber is retransmitted by this switching node through all bearer channels connected to this switching node,
   such retransmission is continued at each switching node upon reception of a build-up packet,
   the method of limiting the number of said build-up packets comprising at each switching node,
   storing of the said call number of the second subscriber upon reception of a first build-up packet during a preetermined time interval, which starts with the reception of said first build-up packet,
   comparing during said time interval the call numbers contained in the subsequently received build-up packets with the call number stored,
   counting of all said subsequently received build-up packets with a call number corresponding wth the call number stored,
   comparing the respective count with a predetermined limiting value,
   and eliminating each of said subsequently received build-up packet, if said respective count is higher than said predetermined limiting value.

2. A swiching node of a digital telecommunication network for the transmission of addressed-coded packets comprising,
   a sorting switch (80) for separating information packets and build-up packets,
   a shift register (82) for storing the incoming build-up packets,
   a store (84) for storing the call-number contained in the first incoming build-up packet for a predetermined time interval, starting by storing the said call-number,
   a comparator circuit (83) connected to said register (82) and said store (84),
   a counter (95) controlled by said comparator circuit (83) for counting the subsequent incoming build-up packets whose call-number corresponds to the call-number stored in said store (84),
   a logic circuit (96, 97) controlled by said counter (95) for causing retransmission of the build-up packet, stored in said register (82), if the position of the counter is lower than or equal to a predetermined limiting value, and
   a timing circuit (87) for resetting said store and said counter on the end of said time interval.

* * * * *